US012720262B2

(12) United States Patent
Hui et al.

(10) Patent No.: US 12,720,262 B2
(45) Date of Patent: Aug. 25, 2026

(54) DIAPHRAGM FOR MINIATURE SOUND-GENERATING DEVICE, AND MINIATURE SOUND-GENERATING DEVICE

(71) Applicant: Goertek Inc., Weifang (CN)

(72) Inventors: Bing Hui, Weifang (CN); Shuqiang Wang, Weifang (CN); Fengguang Ling, Weifang (CN); Chun Li, Weifang (CN); Chunfa Liu, Weifang (CN)

(73) Assignee: Goertek Inc., Weifang (CN)

( * ) Notice: Subject to any disclaimer, the term of this patent is extended or adjusted under 35 U.S.C. 154(b) by 590 days.

(21) Appl. No.: 17/614,264

(22) PCT Filed: Apr. 20, 2020

(86) PCT No.: PCT/CN2020/085570

§ 371 (c)(1),
(2) Date: Nov. 24, 2021

(87) PCT Pub. No.: WO2020/216170

PCT Pub. Date: Oct. 29, 2020

(65) Prior Publication Data

US 2022/0182762 A1 Jun. 9, 2022

(30) Foreign Application Priority Data

Apr. 24, 2019 (CN) ......................... 201910335477.8

(51) Int. Cl.
*H04R 7/02* (2006.01)

(52) U.S. Cl.
CPC ..................................... *H04R 7/02* (2013.01)

(58) Field of Classification Search
CPC .............. C08L 33/08; H04R 2307/023; H04R 2307/025; H04R 9/06
See application file for complete search history.

(56) References Cited

U.S. PATENT DOCUMENTS 4,248,985 A * 2/1981 Ohishi .................. C08F 220/12 525/328.9
4,346,196 A * 8/1982 Hoh .................... C08L 23/0876 525/196
5,344,881 A * 9/1994 Yamamoto .......... C08L 23/0869 525/120
5,523,350 A * 6/1996 Venkataswamy ....... C08L 67/00 525/170
6,342,567 B2 * 1/2002 Minagawa ............ C08L 19/006 525/196
7,598,321 B2 * 10/2009 Talkowski ............ C08L 33/064 525/196
2004/0112672 A1 * 6/2004 Ono ..................... H04R 31/003 181/170
2007/0037924 A1 * 2/2007 Talkowski ............ C08F 210/02 524/556
2008/0269419 A1 * 10/2008 Hustad .................... B32B 27/32 526/170
2009/0274856 A1 * 11/2009 Chou ........................ B32B 7/12 428/35.2
2018/0119765 A1 * 5/2018 Negami .................. C08L 33/16
2018/0227672 A1 * 8/2018 Goossens ................ F01N 1/065

FOREIGN PATENT DOCUMENTS

| | | | | | |
|---|---|---|---|---|---|
| CA | 3140763 | A1 | * | 11/2020 | ................ C08L 7/00 |
| CN | 103080260 | A | | 5/2013 | |
| CN | 204104123 | U | * | 1/2015 | |
| CN | 104403188 | A | * | 3/2015 | ............... B29B 7/28 |
| CN | 109218924 | A | | 1/2019 | |
| EP | 1378539 | A1 | * | 1/2004 | ............... C08K 5/17 |
| WO | WO-9315141 | A1 | * | 8/1993 | .............. C08L 21/00 |

OTHER PUBLICATIONS

Hoffman—AEM, retrieved Mar. 23, 2024. (Year: 2024).*
Machine translation of CN-104403188-A, retrieved Jul. 10, 2024. (Year: 2015).*
Machine translation of CN-204104123-U, retrieved Sep. 3, 2025. (Year: 2015).*

* cited by examiner

*Primary Examiner* — Callie E Shosho
*Assistant Examiner* — Krupa Shukla
(74) *Attorney, Agent, or Firm* — Baker Botts LLP

(57) ABSTRACT

Disclosed are a diaphragm for a miniature sound-generating device, wherein the diaphragm is made of a polyacrylate copolymer, a reinforcing agent is mixed in the polyacrylate copolymer, the polyacrylate copolymer is 100 parts by mass, and the reinforcing agent comprises at least one of carbon black, silicon dioxide, calcium carbonate and barium sulphate, and is 1-90 parts by mass. The diaphragm provided in the disclosure possesses excellent sound performance.

13 Claims, 7 Drawing Sheets

| Mass ratio of polyethylene block to polyacrylate block | 0.05 | 0.1 | 0.2 | 5 | 10 | 15 |
|---|---|---|---|---|---|---|
| Glass transition temperature (°C) | -15.3 | -17.8 | -23.6 | -30.7 | -34.8 | -39.4 |
| Mechanical strength (MPa) | 15.8 | 15.8 | 15.5 | 15.1 | 9.7 | 6.3 |

FIG. 1

| Mass percentage of polycarboxylic acid block (wt%) | 0.1 | 0.5 | 1 | 5 | 10 | 15 |
|---|---|---|---|---|---|---|
| Glass transition temperature (°C) | -35.1 | -35 | -34.6 | -33.7 | -31.2 | -30.9 |
| Elongation at break (%) | 353 | 328 | 315 | 271 | 237 | 141 |

FIG. 2

| Mass part of vulcanizing agent | 0.2 | 0.5 | 0.8 | 3 | 5 | 8 |
|---|---|---|---|---|---|---|
| Glass transition temperature (°C) | -33.1 | -29.7 | -25.3 | -20.4 | -18.9 | -14.9 |
| Elongation at break (%) | 394 | 348 | 317 | 231 | 157 | 101 |

FIG. 3

| Mass part of plasticizer | 0.5 | 1 | 3 | 10 | 13 | 15 |
|---|---|---|---|---|---|---|
| Glass transition temperature (°C) | -18.1 | -22.7 | -25.4 | -28.9 | -35.9 | -39.6 |
| Mechanical strength of material (MPa) | 17.5 | 17.4 | 17.2 | 16.8 | 16.1 | 12.2 |

FIG. 4

| Mass part of plasticizer | 0.5 | 1 | 3 | 7 | 10 | 12 |
|---|---|---|---|---|---|---|
| Glass transition temperature (°C) | -27.3 | -28.1 | -32.6 | -35.7 | -35.9 | -36.8 |
| Mechanical strength of material (MPa) | 16.5 | 16.4 | 16.2 | 16.1 | 16.1 | 15.3 |

FIG. 5

DIAPHRAGM FOR MINIATURE SOUND-GENERATING DEVICE, AND MINIATURE SOUND-GENERATING DEVICE

CROSS-REFERENCE TO RELATED APPLICATIONS

This application is a National Stage of International Application No. PCT/CN2020/085570, filed on Apr. 20, 2020, which claims priority to Chinese Patent Application No. 201910335477.8, filed on Apr. 24, 2019, both of which are hereby incorporated by reference in its entirety.

FIELD OF TECHNOLOGY

The present invention relates to the technical field of electronic products, and in particular to a diaphragm for a miniature sound-generating device and a miniature sound-generating device.

BACKGROUND

A diaphragm for a sound-generating device is generally made of multi-layer composite materials, such as engineering plastics such as polyetheretherketone (PEEK), polyarylate (PAR), polyethylenimine (PEI) and polyimide (PI), elastomer materials such as thermoplastic polyurethane (TPU) and thermoplastic polyester elastomer (TPEE), and adhesive films such as acrylic adhesive films and silicone adhesive films. In addition, silicone rubber has desirable thermal stability and hydrophobic performance and excellent resilience. With increasing demands on high power, waterproof and high sound quality, silicone rubber is gradually used for manufacturing the diaphragm. However, in recent years, the rapid development of small electronic devices such as mobile phones and tablet computers renders the need that miniature sound-generating devices which has smaller size and preferable performance are configured in electronic devices, which leads to existing common composite materials incapable of meeting performance demands.

The above materials have various disadvantages. For example, although engineering plastics such as PEEK and PAR have desirable temperature resistance, the resilience of materials is poor, such that it is easy for products to fold films, and products cannot have the waterproof effect. Elastomer materials such as TPU and TPEE have low melting point and poor temperature resistance. Although the silicone rubber material has preferable thermal stability and resilience, the damping of the material is low due to symmetrical chemical structure, high stereoregularity, small steric hindrance of symmetrically substituted methyl groups, and relatively low modulus or hardness of silicone rubber, resulting in large product distortion of the silicone rubber diaphragm.

It can be seen that the above diaphragm has poor comprehensive performance and accordingly cannot meet the comprehensive performance demands of the miniature sound-generating device. Therefore, it has become a major technical challenge in the technical field to provide a diaphragm for a miniature sound-generating device which has strong comprehensive performance and high reliability.

SUMMARY

One objective of the present invention is to provide the technical solution of a diaphragm for a miniature sound-generating device.

According to the one aspect of the present invention, there is a diaphragm for a miniature sound-generating device. The diaphragm is made of a polyacrylate copolymer, a reinforcing agent is mixed in the polyacrylate copolymer, the polyacrylate copolymer is 100 parts by mass, and the reinforcing agent includes at least one of carbon black, silicon dioxide, calcium carbonate and barium sulphate, and is 1-90 parts by mass.

Optionally, the polyacrylate copolymer is prepared by cross-linking and polymerizing alkyl acrylate serving as a main polymerization monomer and a cross-linking monomer, and the reinforcing agent is 1-85 parts by mass.

Optionally, the reinforcing agent is 2-75 parts by mass.

Optionally, a vulcanizing agent is mixed in the polyacrylate copolymer, and is 0.5-5 parts by mass.

Optionally, the polyacrylate copolymer includes at least one of "ethylene-acrylate copolymer" and "ethylene-acrylate-carboxylic acid copolymer".

Optionally, the reinforcing agent is 2-70 parts by mass.

Optionally, an anti-aging agent is mixed in the polyacrylate copolymer, includes at least one of an anti-aging agent N-445, an anti-aging agent 246, an anti-aging agent 4010, an anti-aging agent SP, an anti-aging agent RD, an anti-aging agent ODA, an anti-aging agent 0D and an anti-aging agent WH-02, and is 0.5-10 parts by mass.

Optionally, the anti-aging agent is 1-5 parts by mass.

Optionally, an internal releasing agent is mixed in the polyacrylate copolymer, includes at least one of stearic acid and stearate, octadecylamine and alkyl phosphate, and α-octadecyl-ω-hydroxy polyoxyethylene phosphate, and is 0.5-5 parts by mass.

Optionally, the internal releasing agent is 1-3 parts by mass.

Optionally, the diaphragm is a single-layer diaphragm, and the single-layer diaphragm is composed of a polyacrylate copolymer diaphragm layer:

or the diaphragm is a composite diaphragm, and the composite diaphragm includes two, three, four or five diaphragm layers, and at least includes one polyacrylate copolymer diaphragm layer.

Optionally, the polyacrylate copolymer diaphragm layer has a thickness of 10-200 μm.

Optionally, the polyacrylate copolymer diaphragm layer has the thickness of 30-120 μm.

According to another aspect of the present invention, there is further provided a miniature sound-generating device, including a sound-generating device body and the above diaphragm, where the diaphragm is arranged on the sound-generating device body, and the diaphragm is configured to be capable of generating sound by vibration.

According to one embodiment disclosed in the present invention, the diaphragm has preferable acoustic performance and higher use stability.

With reference to the detailed description of the accompanying drawings below on the exemplary embodiments of the present invention, other features and advantages of the present invention will become more apparent.

BRIEF DESCRIPTION OF THE DRAWINGS

The drawings, which are incorporated into and constitute a part of the description, illustrate the embodiments of the present invention and, together with the descriptions of the drawings, are used to explain principles of the present invention.

FIG. 1 is a chart of an influence of a mass ratio of a polyethylene block to a polyacrylate block of a diaphragm provided by the present invention on glass transition temperature and mechanical strength;

FIG. 2 is a chart of an influence of a polycarboxylic acid block of the diaphragm provided by the present invention on the glass transition temperature and elongation at break;

FIG. 3 is a chart of an influence of using amount of a vulcanizing agent of the diaphragm provided by the present invention on the glass transition temperature and the elongation at break;

FIG. 4 is a chart of a relation between mixing amount of a plasticizer in a diaphragm provided by the present invention and made of an acrylic rubber (ACM)-type polymer and glass transition temperature and mechanical strength of a material:

FIG. 5 is a chart of a relation between mixing amount of a plasticizer in a diaphragm provided by the present invention and made of an ethylene acrylic rubber (AEM)-type polymer and the glass transition temperature and the mechanical strength of the material:

DESCRIPTION OF THE EMBODIMENTS

Figure 6:
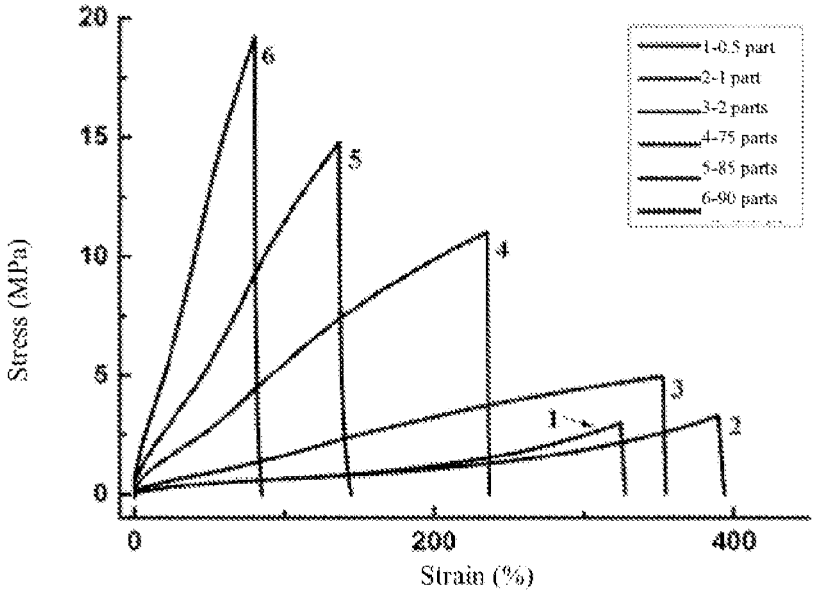
FIG. 6 is a chart of a relation between a stress-strain curve of the diaphragm provided by the present invention and made of the ACM-type polymer and mixed parts of carbon black.

Various exemplary embodiments of the present invention will be described in detail now with reference to the accompanying drawings. It should be noted that the relative arrangement, numerical expressions and values of components and steps described in these embodiments do not limit the scope of the present invention unless otherwise specified.

The following description of at least one exemplary embodiment is merely illustrative in nature and in no way serves as any limitation of the present invention and its application or uses.

Techniques, methods, and apparatuses known to those of ordinary skill in the related field may not be discussed in detail but, where appropriate, should be considered a part of the description.

In all examples shown and discussed herein, any specific value should be interpreted as merely exemplary and not as a limitation. Therefore, other examples of the exemplary embodiments may have different values.

It should be noted that similar reference numerals and letters in the following drawings represent similar items, and therefore, once an item is defined in one drawing, the item does not need to be further discussed in subsequent drawings.

The present invention provides a diaphragm for a sound-generating device. The diaphragm is made of a polyacrylate copolymer. A material formed by polymerizing polyacrylate as a main monomer is acrylic rubber.

The polyacrylate copolymer of the present invention may specifically include two different materials, where the two specific materials both belong to acrylic rubber and may achieve the technical effect required by the present invention.

In one implementation, the polyacrylate copolymer includes an "ethylene-acrylate copolymer", which is an ethylene acrylic rubber (AEM)-type copolymer. A molecular formula of the "ethylene-acrylate copolymer" may be shown as follows:

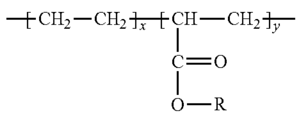

where in the above molecular formula, x and y are natural numbers, and R is an alkyl group.

Specifically, a mass ratio of a polyethylene block to a polyacrylate block is 0.05-10. The polyethylene block provides toughness in a material matrix, such that the rubber has desirable low temperature resistance. When the content of the polyethylene block is too high, rigidity of the acrylic rubber is not enough to meet the requirements of use. As shown in FIG. 1, along with increase of the ratio of the polyethylene block to the polyacrylate block, glass transition temperature of a material is gradually reduced, and mechanical strength of the material is kept unchanged and then is sharply reduced. Especially, when the ratio is 15, the mechanical strength of the material is merely 6.3 MPa. Therefore, the present invention preferably limit the mass ratio of the polyethylene block to the polyacrylate block within a range of 0.05-10, which may not only meet needs of the diaphragm on mechanical performance of toughness, etc., but also provide desirable low temperature resistance. The mass ratio of the polyethylene block to the polyacrylate block is preferably 0.1-5.

Further optionally, the polyacrylate copolymer further may include an "ethylene-acrylate-carboxylic acid copolymer". A molecular formula of the "ethylene-acrylate-carboxylic acid copolymer" is shown as follows:

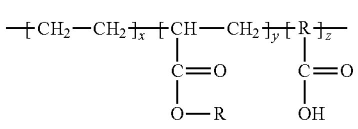

where in the above molecular formula, x, y and z are natural numbers, and R and R' are alkyl groups.

Specifically, the mass ratio of the polyethylene block to the polyacrylate block is 0.1-10, a polycarboxylic acid block accounts for 0.5 wt %-10 wt % of total mass of the polyacrylate copolymer, the polycarboxylic acid block has a cross-linking effect in the matrix, and the higher the content is, the greater a cross-linking degree of the material matrix, the greater the rigidity of the material is. The too great cross-linking degree makes the rubber lose high elasticity of the rubber. If a mass proportion of the polycarboxylic acid block is too high, the cross-linking degree of the acrylic rubber is too great, such that the elasticity of the rubber is remarkably reduced. FIG. 2 shows an influence of percentage content of the polycarboxylic acid block on the glass transition temperature and elongation at break of the material. It may be seen from the figure that along with increase of the mass proportion of the polycarboxylic acid block, the cross-linking degree of the material is increased, movement of a molecular chain is limited, the glass transition temperature is increased, and the elongation at break is reduced. Therefore, the present invention limits a range of the polycarboxylic acid block accounting for the total mass of the polyacrylate copolymer within a range of 0.5 wt %-10 wt %, so as to make the polyacrylate copolymer have the glass transition temperature and the elongation at break which meet performance requirements. The mass ratio of the polyethylene block to the polyacrylate block is preferably 0.2-5, and the range of the polycarboxylic acid block accounting for the total mass of the polyacrylate copolymer is 1 wt %-5 wt %.

In another implementation, the polyacrylate copolymer is prepared by cross-linking and polymerizing alkyl acrylate as a main polymerization monomer and a cross-linking monomer, and is an acrylic rubber (ACM)-type copolymer. A molecular formula of the ACM-type copolymer is optionally shown as follows:

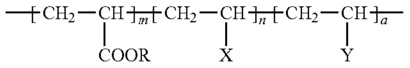

where in the above molecular formula, R may be at least one of alkyl, ethyl, methyl, or n-butyl main monomers;

X is a $COO(CH_2)_2OCH_3$—CN comonomer;

Y is at least one of a —COOH cross-linking functional group, an —$OCOCH_2Cl$ cross-linking functional group, an —$OCH_2CH_2Cl$ cross-linking functional group, an epoxy cross-linking functional group, or an unsaturated olefin group; and M, n and a are natural numbers.

The acrylic rubber has a high damping factor, influence factors of the acrylic rubber include the cross-linking degree, intermolecular hydrogen bonds, the content of a plasticizer, etc., and the larger greater the above factors are within a certain range, the greater the damping factor is, the more desirable the damping performance is, the lower distortion of the diaphragm during sound-generating is.

The content of the polyacrylate block influences the number of the intermolecular hydrogen bonds. The higher the content of the polyacrylate block is, the more the intermolecular hydrogen bonds are, the more difficult the movement of the molecular chain is. Correspondingly, the damping factor is increased along with the increase of the glass transition temperature. The intermolecular hydrogen bonds belong to physical entanglement, and the more the intermolecular hydrogen bonds are, the higher the mechanical strength of the material is within a certain range. However, the influence of the number of the intermolecular hydrogen bonds on the mechanical strength is less than the influence of the cross-linking degree on the mechanical strength of the material.

Optionally, a vulcanizing agent is mixed in the ACM-type copolymer. The polyacrylate copolymer is 100 parts by mass, and the vulcanizing agent is 0.5-5 parts by mass. Addition of the vulcanizing agent contributes to forming cross-linking points in the polyacrylate copolymer, thereby improving the cross-linking degree of the copolymer. However, if mixing amount of the vulcanizing agent is too high, as shown in FIG. 3, the cross-linking degree of the polyacrylate copolymer is remarkably increased, such that movement of the molecular chain in the copolymer is limited, the glass transition temperature is increased, and the elongation at break is reduced. Therefore, in the implementation of the present invention, the vulcanizing agent is 0.5-5 parts by mass. Preferably, the vulcanizing agent is 0.8-3 parts by mass. Under the condition of the above mass parts, it may be guaranteed that the polyacrylate copolymer has the proper cross-linking degree, and may meet the requirements for the glass transition temperature and the mechanical performance of the material.

Optionally, the vulcanizing agent includes at least one of trimercapto-s-triazine vulcanization system, polyamine, organic acid, ammonium salt, organic acid ammonium salt, diethyldithiocarbamate, imidazole/anhydride, isocyanuric acid/quaternary salt, sulfur/accelerator, and peroxide.

Optionally, a plasticizer may be mixed in the polyacrylate copolymer and includes at least one of aliphatic dibasic acid esters, phthalic acid esters, benzene polyacid esters, benzoic ethers, polyol esters, chlorinated hydrocarbons, epoxides, citrate esters and polyesters.

A polar group on the plasticizer and a polar group on the polyacrylate block have a mutual attraction effect, thereby reducing interaction of the polar group on the polyacrylate block, and accordingly, addition of the plasticizer is equivalent to covering the polar group on the polyacrylate block to achieve a shielding effect, and as a result, physical cross-linking points are reduced. On the other hand, molecules of the plasticizer are much smaller than those of the polyacrylate block and move easily, thereby providing a space required for movement of a chain segment conveniently, reducing the glass transition temperature of the material, increasing cold resistance of the material, and improving the processability of the material.

In one implementation, optionally, the plasticizer is 1-13 parts by mass under the condition that the above ACM-type copolymer is 100 parts by mass. As shown in FIG. 4, along with increase of using amount of the plasticizer, the glass transition temperature of the material is reduced, but correspondingly, tensile strength of the material is reduced. When the content of the plasticizer is 15, the tensile strength of the material is greatly reduced. In addition, the excessive amount of the plasticizer may be separated out from the interior of the material, thereby reducing the mechanical performance of the material. When the mass parts of the plasticizer are in accordance with the above range, it may be guaranteed that the performance of the polyacrylate copolymer may meet performance requirements of the diaphragm. Preferably, the plasticizer is 3-10 parts by mass.

In another implementation, optionally, the plasticizer is 1-10 parts by mass under the condition that the above AEM-type copolymer is 100 parts by mass. As shown in FIG. 5, along with increase of the using amount of the plasticizer, the glass transition temperature of the material is reduced, but correspondingly, the tensile strength of the material is reduced. When the content of the plasticizer is 12, the tensile strength of the material is greatly reduced. In addition, the excessive amount of the plasticizer may be separated out from the interior of the material, thereby reducing the mechanical performance of the material. Preferably, the plasticizer is 3-7 parts by mass.

Optionally, a reinforcing agent may be mixed in the polyacrylate copolymer, and includes at least one of carbon black, silicon dioxide, calcium carbonate, and barium sulphate. The reinforcing agent is 1-90 parts by mass under the condition that the polyacrylate copolymer is 100 parts by mass.

A surface of the reinforcing agent has groups of hydrogen, carboxyl, a lactone group, a free radical, a quinonyl, etc. which may be subjected to reactions of substitution, reduction, oxidation, etc. After the reinforcing agent is mixed into the polyacrylate copolymer, due to strong interaction between the reinforcing agent and an interface of the polymer block, when the material is stressed, the molecular chain easily slides on surfaces of particles of the reinforcing agent, but it is not easy for the molecular chain to be separated from the particles of the reinforcing agent, the polyacrylate copolymer and the particles of the reinforcing agent form a slidable strong bond, such that the mechanical strength is increased.

By taking the carbon black as an example, the carbon black is an amorphous structure, and particles form aggregates by means of physical and chemical bonding between each other. A primary structure of the carbon black is composed of the aggregates, and moreover, a Van der Waals force or hydrogen bonds exist between the aggregates, such that the aggregates may be aggregated into a space network structure, that is, a secondary structure of the carbon black. A surface of the carbon black has the above groups. The particles of the carbon black may form the above relation with the molecular chain of the copolymer, thereby enhancing the mechanical strength of the polyacrylate copolymer. However, if the mechanical strength is too high, a resonance frequency of the miniature sound-generating device is too high, and the low-frequency response capability of the miniature sound-generating device is reduced.

In one implementation, optionally, the reinforcing agent is 1-85 parts by mass under the condition that the above ACM-type copolymer is 100 parts by mass. As shown in FIG. 6, by selecting the carbon black as the reinforcing agent as an example, when the carbon black is 0.5 part by mass, both the mechanical strength and the elongation at break of the polyacrylate copolymer are both small since the amount of the carbon black is small, the carbon black is not uniformly dispersed in the matrix, and it is difficult for the carbon black to have the reinforcing effect. Along with the increase of the mass parts of the carbon black, the mechanical strength of the ACM-type copolymer is increased, and the elongation at break of the ACM-type copolymer is gradually reduced. Especially, when the carbon black is 90 parts, the elongation at break of the ACM-type copolymer is reduced to 83%. Under this condition, there is a risk of diaphragm breaking in long-term use of the manufactured diaphragm. Therefore, preferably, when the reinforcing agent is 1-85 parts by mass, the requirement of the present invention for performance of the diaphragm may be preferably met. Preferably, the reinforcing agent is 2-75 parts by mass.

Figure 7:
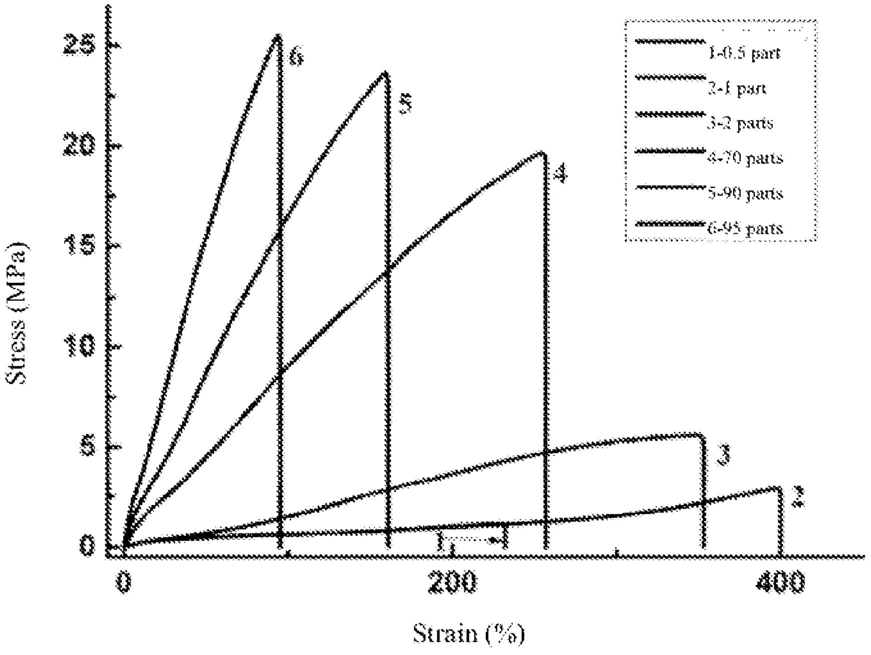
FIG. 7 is a chart of a relation between a stress-strain curve of the diaphragm provided by the present invention and made of the AEM-type polymer and mixed parts of carbon black.

In another implementation, the reinforcing agent is 1-90 parts by mass under the condition that the AEM-type copolymer is 100 parts by mass. As shown in FIG. 7, by taking the carbon black as the reinforcing agent as an example, when the carbon black is 0.5 part by mass, the mechanical strength and the elongation at break of the polyacrylate copolymer are small since the amount of the carbon black is small, the carbon black is not uniformly dispersed in the matrix, and it is difficult for the carbon black to have the reinforcing effect. Along with the increase of the mass parts of the carbon black, the mechanical strength of the AEM-type copolymer is increased, and the elongation at break of the AEM-type copolymer is gradually reduced. Especially, when the carbon black is 95 parts, the elongation at break of the AEM-type copolymer is reduced to 95%. Under this condition, there is a risk of diaphragm breaking in long-term use of the manufactured diaphragm. Therefore, optionally, when the reinforcing agent is 1-90 parts by mass, the requirement of the present invention for the performance of the diaphragm may be met. Preferably, the reinforcing agent is 2-70 parts by mass.

Optionally, a cross-linking agent is mixed in the polyacrylate copolymer, and includes a peroxide cross-linking agent and an assistant cross-linking agent. The peroxide cross-linking agent is used for making the "ethylene-acrylate copolymer" generate a free radical. The assistant cross-linking agent is used for carrying out free radical polymerization with the "ethylene-acrylate copolymer".

The peroxide cross-linking agent includes at least one of 1,3-1,4-bis(tert-butyldioxyisopropyl)benzene, dicumyl peroxide, 2,5-dimethyl-2,5-bis(tert-butylperoxy)hexane, tert-butyl cumyl peroxide, 2,5-dimethyl-2,5-di(tertiary-butylperoxy)-hexyne-3, butyl 4,4'-bis(tert-butylperoxy)valerate, 1,1'-bis(tert-butylperoxy)-3,3,5-trimethylcyclohexane, and 2,4-dichlorobenzoyl peroxide.

The assistant cross-linking agent includes at least one of trimethylolpropane triacrylate, trimethylolpropane trimethacrylate, N,N'-1,3-phenylene bismaleimide, diallyl phthalate, triallyl isocyanate and triallyl cyanate.

The cross-linking agent and generated cross-linking points may determine the cross-linking degree of the polyacrylate copolymer. Within a certain range, the more the cross-linking points are, the greater using amount of the cross-linking agent is, the higher the cross-linking degree is. The excessively-high cross-linking degree may lead to the molecular chain to move more difficultly, such that the glass transition temperature of the polyacrylate copolymer is increased, and the damping factor is increased. Along with the increase of the mechanical strength of the material, the elongation at break and an elastic recovery rate are reduced.

Further, the material of the diaphragm further may include an amide cross-linked polymer and/or imide cross-linked polymer formed by a reaction of an "ethylene-acrylate-carboxylic acid copolymer" and an amine substance cross-linking agent. The amine substance cross-linking agent includes at least one of hexamethylenediamine, hexamethylenediamine carbamate, triethylene tetramine, methylene diphenylamine and di-o-toluene arc.

By adjusting the mass ratio of the polyethylene block to the polyacrylate block, the content of the polycarboxylic acid block and the using amount of the cross-linking agent, the glass transition temperature may be adjusted. For example, the mass ratio of the polyethylene block to the polyacrylate block is 0.2-5, the mass percentage of the polycarboxylic acid block is 1 wt %-5 wt %, and addition amount of the cross-linking agent is 1-5 parts, which makes the glass transition temperature of the acrylic rubber≤−20° C. The glass transition temperature makes the diaphragm of a loudspeaker kept in a high elastic state at normal temperature, and the diaphragm has desirable resilience. Further, since the polyacrylate copolymer has a stable chain structure, the diaphragm has a high upper use temperature limit.

By testing, the diaphragm may continuously work for more than 72 hours, and may meet high-low temperature and long-time application requirements of the miniature sound-generating device under the condition of 200° C. A risk of structural collapse caused by overhigh temperature is avoided in field use.

Optionally, an anti-aging agent is mixed in the polyacrylate copolymer, and includes at least one of an anti-aging agent N-445, an anti-aging agent 246, an anti-aging agent 4010, an anti-aging agent SP, an anti-aging agent RD, an anti-aging agent ODA, an anti-aging agent 0D and an anti-aging agent WH-02. The anti-aging agent is 0.5-10 parts by mass.

In a use process of the acrylic rubber, as use time goes on, the molecular chain of the polyacrylate copolymer is gradually broken, thereby generating the free radical, which is a natural aging phenomenon of the acrylic rubber. The anti-aging agent is mixed in the polyacrylate copolymer, thereby preventing, stopping or slowing down an autocatalysis phenomenon of generating the active free radical in the acrylic rubber. If mixing amount of the anti-aging agent is too little, the effect of prolonging the service life of the acrylic rubber may not be achieved. If the mixing amount of the anti-aging agent is too much, the mechanical performance of the polyacrylate copolymer is possibly reduced since it is difficult for the anti-aging agent to sufficiently dissolve with the polyacrylate copolymer and be uniformly dispersed. Therefore, the mass parts of the anti-aging agent is optionally within a range of 0.5-10 parts under the condition that the polyacrylate copolymer is 100 parts by mass. Preferably, the anti-aging agent is 1-S parts by mass.

Optionally, an internal releasing agent is mixed in the polyacrylate copolymer. The internal releasing agent includes at least one of stearic acid and stearate, octadecylamine and alkyl phosphate, and α-octadecyl-ω-hydroxy polyoxyethylene phosphate.

The acrylic rubber including the "ethylene-acrylate copolymer" has relatively low mooney viscosity and green strength, which leads to technological problems of roller sticking, diaphragm sticking, etc. of the acrylic rubber in an injection molding process. The present invention improves, by adding the internal releasing agent into a sizing material of the polyacrylate copolymer, the processability of the copolymer.

If mixing amount of the internal releasing agent is little, it is difficult for the internal releasing agent to achieve the improvement in the diaphragm sticking problem. If the mixing amount is too great, it is easy to lead to decrease of an adhesive force between the acrylic rubber and an adhesive layer when the acrylic rubber prepares the diaphragm in later stage, such that the performance of the final manufactured diaphragm is adversely influenced. In the implementation of the present invention, the internal releasing agent is optionally 0.5-5 parts by mass under the condition that the polyacrylate copolymer is 100 parts by mass. Preferably, the internal releasing agent is 1-3 parts by mass.

Optionally, the glass transition temperature of the diaphragm has a range of −70-0° C. Since the polyacrylate copolymer has high molecular weight and the molecular chain of the polyacrylate copolymer is flexible, the polyacrylate copolymer has desirable low temperature resistance. When the diaphragm meets the above range of the glass transition temperature, the diaphragm of the loudspeaker may be kept in the high elastic state at the normal temperature, and has desirable resilience. Within a certain range, the lower the glass transition temperature is, the diaphragm may work normally at a lower temperature. The lower the glass transition temperature is, the lower the resonant frequency (F0) of the assembled miniature sound-generating device is under the condition that a thickness of the diaphragm is not changed.

In one implementation, for the above ACM-type copolymer, the glass transition temperature of the diaphragm has the range of −60-0° C., which is preferably −50-−20° C., which makes the diaphragm of the loudspeaker keep desirable elasticity all the time when working when the glass transition temperature is lower than 0° C., such that the loudspeaker shows high sound quality. Moreover, a risk of breaking of the diaphragm of the loudspeaker in a low-temperature environment is reduced, and the reliability is higher.

In another implementation, for the above AEM-type copolymer, the glass transition temperature of the diaphragm has a preferred range of −60-−20° C., which makes the diaphragm of the loudspeaker keep desirable elasticity all the time when working when the glass transition temperature is lower than 0° C., such that the loudspeaker shows high sound quality. Moreover, the risk of breaking of the diaphragm of the loudspeaker in the low-temperature environment is reduced, and the reliability is higher.

Since the polyacrylate copolymer used in the present invention contains a large amount of ester groups, when the polyacrylate copolymer is used for preparing the diaphragm, the polyacrylate copolymer and the adhesive layer may form a hydrogen bonding effect, and accordingly the diaphragm has excellent adhesiveness. Optionally, the adhesive force between the polyacrylate copolymer and the adhesive layer is greater than 100 g/25 mm (180° peel), and preferably, the adhesive force is greater than 200 g/25 mm (180° peel). The adhesive force is high, such that the diaphragm has desirable coordination and consistency with a reinforcement (DOME) in a vibration process, and has pure sound quality, and the diaphragm of the loudspeaker is still kept in an initial state after long-time vibration, and has high performance stability.

The adhesive force of the diaphragm mainly has effects of two aspects. In a particular implementation of the present invention, the diaphragm may be a composite diaphragm, that is, the diaphragm includes a plurality of diaphragm layers, at least one of which is made of the polyacrylate copolymer. The plurality of diaphragm layers may be compounded in modes of adhesion, hot pressing, etc., thereby forming the above composite diaphragm. The desirable adhesive performance of the polyacrylate copolymer may guarantee structural stability and reliability of the composite diaphragm. On the other hand, the diaphragm needs to adhere and be assembled to a voice coil, a centring disk, the DOME, etc. by means of the adhesive layer in practical application. Desirable adhesive performance of the diaphragm may have the effect in assembly, thereby improving acoustic performance and structural reliability of a miniature sound-generating device product.

Optionally, the adhesive layer includes one or more of epoxides, acrylic acid, organic silicon resin, polyesters, polyurethane, chloroacetic resin, phenolic resin and urea formaldehyde resin.

Optionally, the diaphragm has the elongation at break greater than 100%. Preferably, the diaphragm has the elongation at break greater than 150%. The diaphragm has the high elongation at break, such that reliability problems of diaphragm breaking, etc. are not easy to occur when the diaphragm is used in the sound-generating device.

Figure 8:
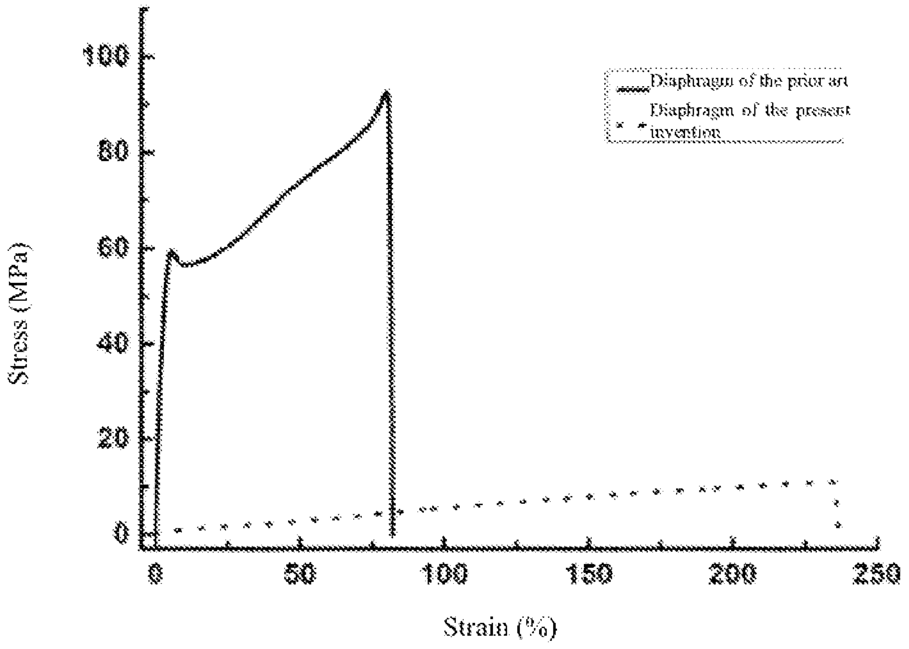
FIG. 8 is a comparison chart of stress-strain curves of the diaphragm provided by the present invention and an existing conventional diaphragm.

As shown in FIG. 8, under the same stress, strain of the diaphragm provided by the embodiment of the present invention is remarkably greater than that of a polyetheretherketone (PEEK) diaphragm in the prior art, which indicates that Young modulus of the diaphragm provided by the embodiment of the present invention is remarkably less than that of the PEEK diaphragm in the prior art.

In addition, the existing PEEK diaphragm forms remarkable yield points at about 0.4%-0.5%$_{strain}$, while the diaphragm of the loudspeaker provided by the present invention does not have yield points, which indicates that the diaphragms provided by the present invention have a wider elastic region and excellent resilience.

The diaphragm made of the polyacrylate copolymer has desirable flexibility, for example, the elongation at break≥100%, where the polyethylene block has an important influence on the elongation at break, which may be selected by those skilled in the art according to actual needs, which makes the diaphragm of the loudspeaker have greater vibration displacement, greater loudness and desirable reliability and durability. The more desirable the flexibility of the material is, the greater the elongation at break is, the stronger the capability of the diaphragm to resist breaking is. When the diaphragm vibrates in a large-amplitude state, the material generates great strain, and a risk of diaphragm folding, diaphragm cracking or diaphragm breaking occurs during long-time vibration. The diaphragm having the polyacrylate copolymer as a base material of the present invention has desirable flexibility, thereby reducing the risk of diaphragm breaking. The higher the elongation at break is, the lower a diaphragm breaking rate of the diaphragm in long-term use is.

Compared with engineering plastics, the polyacrylate copolymer provided by the present invention has the wider elastic region, and when the strain of the diaphragm occurs in the region, the diaphragm has excellent resilience after an external force is removed. Correspondingly, in the vibration process of the diaphragm, swinging vibration is little, and the sound quality and the sound listening stability are more excellent. Further, the diaphragm may be continuously used at 200° C., and has higher damping performance compared with an existing material. By taking the diaphragm made of the AEM-type copolymer as an example, the elastic recovery rate of a diaphragm layer after 20% strain≥90%. Since the resilience of the diaphragm is desirable, the sound-generating device has desirable transient response and low distortion.

Figure 9:
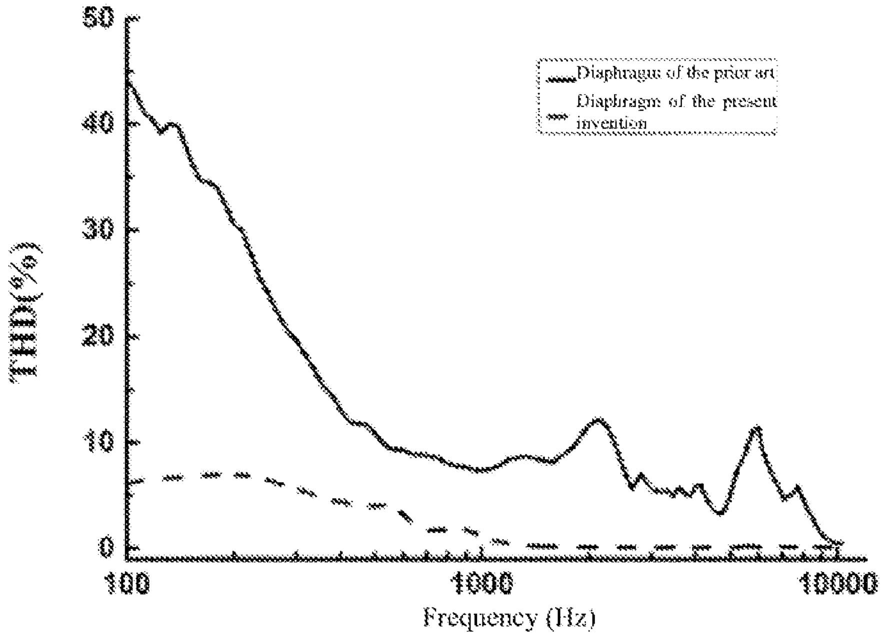
FIG. 9 is a comparison chart of harmonic distortion test curves of the diaphragm provided by the present invention and the existing conventional diaphragm.
Figure 10:
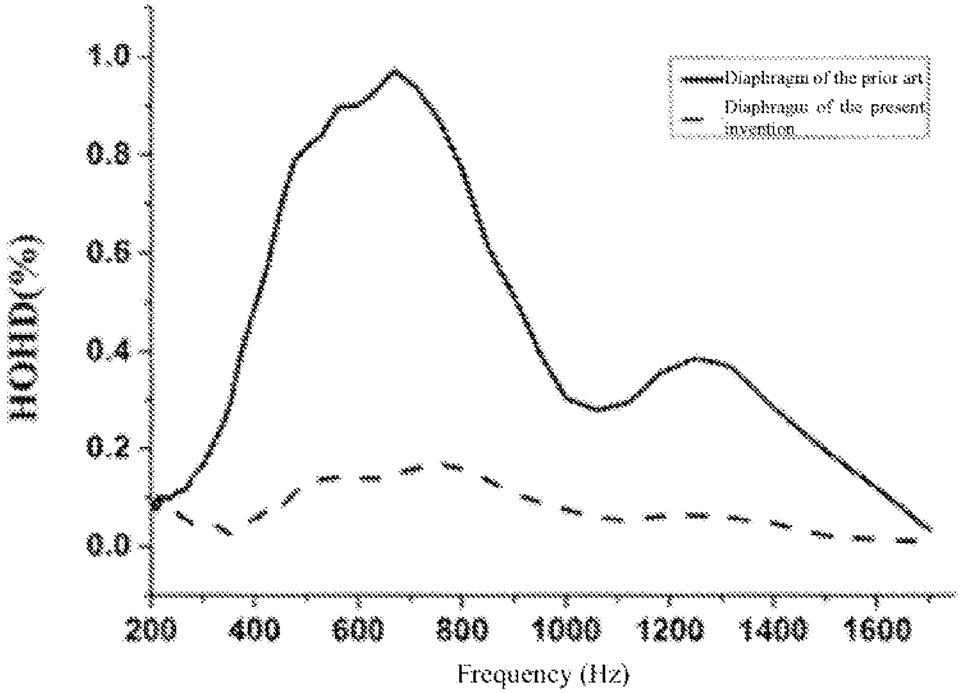
FIG. 10 is a comparison chart of high-order harmonic distortion test curves of the diaphragm provided by the present invention and the existing conventional diaphragm.

As shown in FIGS. 9 and 10, the diaphragm provided by the present invention has lower total harmonic distortion (THD) and high-order harmonic distortion (HOHD) than the existing PEEK diaphragm and has no peak, which indicates that the diaphragm of the present invention has more excellent polarization resistance and more desirable sound quality.

The diaphragm provided by the present invention is in the high elastic state at room temperature, the molecular chain is easy to move, intermolecular friction force is great, and the diaphragm has desirable damping performance. Optionally, a loss factor of the diaphragm is greater than 0.06. The excellent damping performance makes the diaphragm have lower impedance. The damping performance of the diaphragm is improved, the capability of a vibration system of the sound-generating device to restrain a polarization phenomenon in the vibration process is enhanced, and vibration consistency is desirable. The existing diaphragm made of engineering plastics has low damping, a loss factor of the diaphragm is generally less than 0.01, and the damping performance is small. Preferably, the loss factor of the diaphragm provided by the present invention is greater than 0.1.

Figure 11:
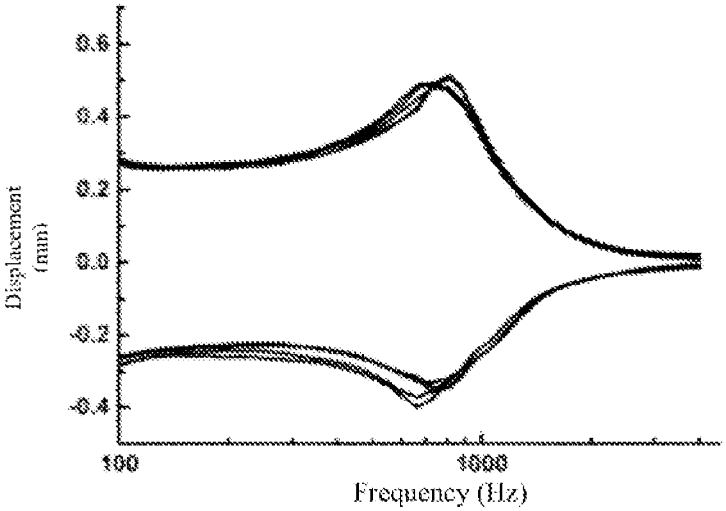
FIG. 11 is a chart of a test curve of vibration displacement of different parts of the diaphragm provided by the present invention at different frequencies.
Figure 12:
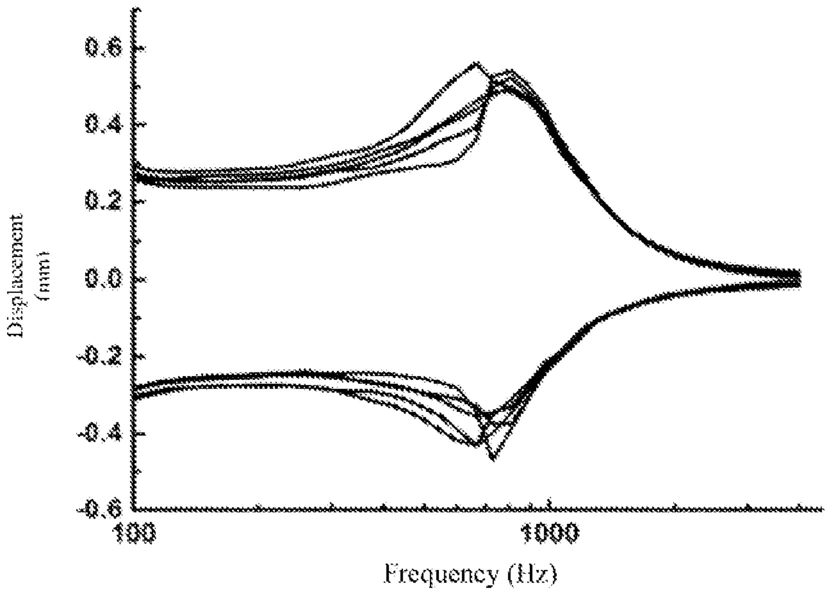
FIG. 12 is a chart of a test curve of vibrational displacement of different parts of a diaphragm in the prior art at different frequencies.

FIG. 11 is a test curve of vibration displacement of different parts of a diaphragm for a sound-generating device according to an embodiment of the present invention at different frequencies, and FIG. 12 is a test curve of vibration displacement of different parts of an existing diaphragm at different frequencies, where the diaphragms are rectangular folded ring diaphragms; and an abscissa is frequency (Hz), and an ordinate is loudness displacement (mm). Points are taken at an edge position and a center position of a center part of the diaphragm for testing.

It may be seen that curves in FIG. 11 are more concentrated, while the curves in FIG. 12 are dispersed, which indicates that vibration consistency of parts of the diaphragm for the sound-generating device of the embodiment of the present invention is more desirable, and the diaphragm has little swing vibration, and more excellent sound quality and sound listening stability in the vibration process.

Optionally, Shore hardness of the diaphragm has a range of 15-90 A, which is preferably 20-80 A. The F0 of the sound-generating device is directly proportional to the modulus, hardness and thickness of the diaphragm, while the modulus of the polyacrylate copolymer is directly proportional to the hardness. Therefore, the modulus of the diaphragm may be embodied in terms of hardness.

Figure 13:
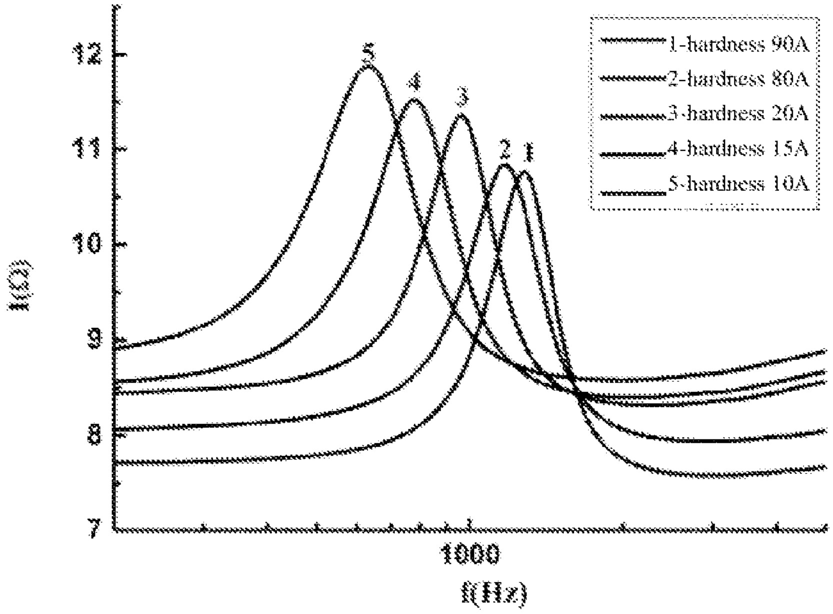
FIG. 13 is a comparison chart of impedance curves of diaphragms having different hardness in different implementations of the present invention.

The strength and hardness of the polyacrylate copolymer may be adjusted by means of the reinforcing agent. On the other hand, by increasing the amount of the polyacrylate block, the intermolecular hydrogen bonds are increased, such that the strength and hardness of the material are increased, and cross-linking points are increased. The higher the strength and hardness of the polyacrylate copolymer are, the higher the F0 of the diaphragm is, correspondingly, the loudness of the sound-generating device is reduced, and bass performance is worsened. FIG. 13 is impedance curves of diaphragms having the same thickness and different hardness, and it may be seen from the figure that along with increase of the hardness, the F0 is sharply increased.

The diaphragm for the miniature sound-generating device provided by the present invention is a folded ring diaphragm or a flat plate diaphragm. The F0 of the sound-generating device is directly proportional to the Young modulus and the thickness of the diaphragm, the F0 may be changed by changing the thickness and the Young modulus of the diaphragm of the loudspeaker, and a specific adjustment principle is as follows:

$$F0 = \frac{1}{2\pi}\sqrt{\frac{1}{CmsMms}}$$

Where Mms is equivalent vibrational mass of the loudspeaker, and Cms is equivalent compliance of the loudspeaker:

$$Cms = \frac{(C_{m1} * C_{m2})}{(C_{m1} + C_{m2})}$$

where $C_{m1}$ is elastic wave compliance, and $C_{m2}$ is diaphragm compliance. During elastic-wave-free design, the equivalent compliance of the loudspeaker is the diaphragm compliance:

$$C_{m2} = \frac{(1-u^3)W^3}{\pi(W+dvc)t^3 E a_1 a_2}$$

Wherein W is a total width of a folded ring part of the diaphragm, and t is a thickness of the diaphragm; dvc is a fitting outer diameter of a voice coil of the diaphragm; E is the Young modulus of the material of the diaphragm; and u is a Poisson ratio of the material of the diaphragm.

It may be seen that the F0 of the sound-generating device is directly proportional to the modulus and thickness of the diaphragm, and the modulus of the diaphragm is directly proportional to the hardness of the diaphragm. Therefore, the hardness may be used to replace the modulus of the diaphragm. In order to obtain full bass and comfortable hearing, the diaphragm should have sufficient rigidity and damping while the sound-generating device has the low F0. Those skilled in the art may adjust the size of the F0 by adjusting the hardness and thickness of the diaphragm of the loudspeaker. Preferably, the Shore hardness of the diaphragm is preferably 20-80 A, and the thickness of the diaphragm is 60-120 μm. Within the above preferred range, the F0 of the miniature sound-generating device may reach 150-1500 Hz. The miniature sound-generating device has excellent low-frequency performance.

Optionally, the diaphragm may be of a single-layer structure or a multi-layer composite diaphragm. The single-layer diaphragm is a diaphragm formed by a polyacrylate copolymer diaphragm layer. The composite diaphragm is a diaphragm formed by sequentially laminating a plurality of polyacrylate copolymer diaphragm layers. Or, the composite diaphragm may include at least one polyacrylate copolymer diaphragm layer, and the polyacrylate copolymer diaphragm layer is laminated and compounded with diaphragm layers made of other materials to form the composite diaphragm made of a plurality of materials. The composite diaphragm may be a two-layer, three-layer, four-layer or five-layer composite diaphragm, which is not limited by the present invention. The at least one diaphragm layer in the composite diaphragm is a polyacrylate copolymer diaphragm layer prepared from the polyacrylate copolymer provided by the present invention.

The thickness of the polyacrylate copolymer diaphragm layer is optionally 10-200 μm, which is preferably 30-120 μm. When the thickness of the polyacrylate copolymer diaphragm layer is within the range, the performance requirement and the assembly space requirement of the miniature sound-generating device may be preferably met.

Figure 14:
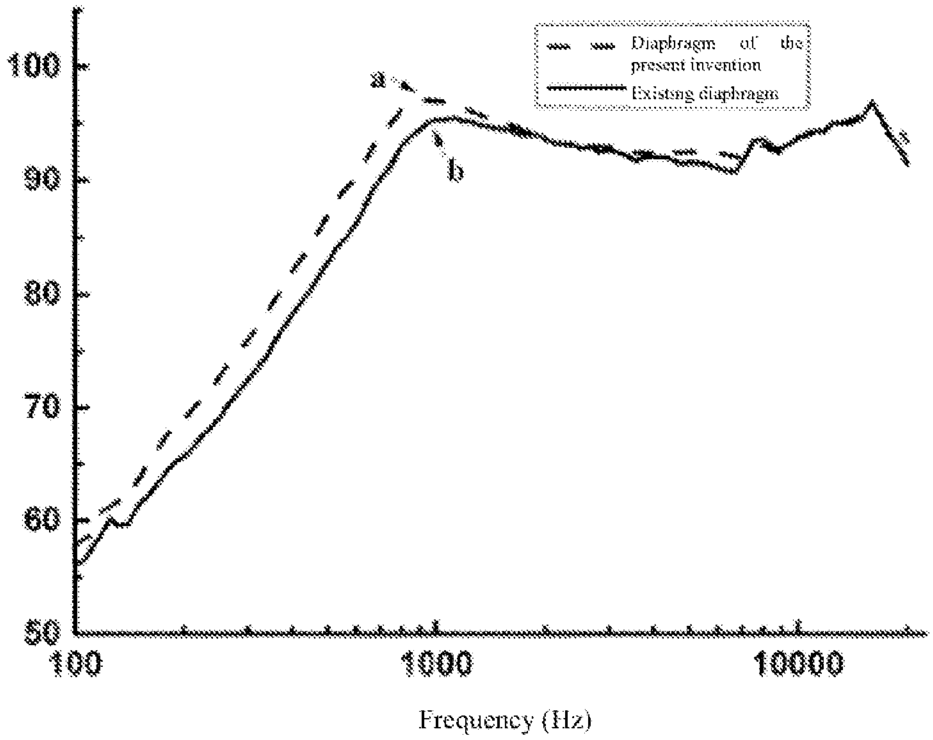
FIG. 14 is a comparison chart of test curves of loudness of the diaphragm provided by the present invention and the existing diaphragm at different frequencies.

The present invention provides a comparison curve chart of one specific implementation of the diaphragm provided by the present invention and an existing conventional diaphragm, which is as shown in FIG. 14. FIG. 14 shows test curves (sound pressure level (SPL) curves) of loudness of two diaphragms at different frequencies. The diaphragms are folded ring diaphragms. An abscissa is frequency (Hz) and an ordinate is loudness.

A dotted line is a test curve of the diaphragm for the miniature sound-generating device provided by the present invention. A solid line is a test curve of the existing conventional diaphragm.

It may be seen from the SPL curves that intermediate frequency performances of the two diaphragms are similar. The F0 of the miniature sound-generating device using the diaphragm provided by the present invention is 806 Hz, that is, position a in the figure, while the F0 of a sound-generating device using the existing diaphragm is 886 Hz, that is, position b in the figure, which indicates that low frequency sensitivity of the diaphragm of the embodiment of the present invention is higher than that of the existing PEEK diaphragm. That is, by using the diaphragm provided by the present invention, the miniature sound-generating device may have higher loudness and comfort level.

The present invention further provides a miniature sound-generating device. The miniature sound-generating device includes a sound-generating device body and the diaphragm made of the polyacrylate copolymer. The polyacrylate copolymer may be the above AEM-type copolymer or the ACM-type copolymer, which is not limited by the present invention. The diaphragm is arranged on the sound-generating device body, and the diaphragm is configured to be capable of being driven to vibrate, thereby generating sound by means of vibration. Components of a coil, a magnetic circuit system, etc. may be arranged in the sound-generating device body, and the diaphragm is driven to vibrate by means of electromagnetic induction.

Although some specific embodiments of the present invention are described in detail by means of examples, those skilled in the art should understand that the above examples are merely for illustration instead of limitation of the scope of the present invention. Those skilled in the art should understand that modifications to the above embodiments may be made without departing from the scope and spirit of the present invention. The scope of the present invention is defined by the appended claims.

What is claimed is:

1. A diaphragm for a miniature sound-generating device, comprising a polyacrylate copolymer and a reinforcing agent mixed therein, wherein the polyacrylate copolymer is 100 parts by mass, and the reinforcing agent is selected from the group consisting of a carbon black, a silicon dioxide, a calcium carbonate and barium sulphate, and wherein the reinforcing agent is 1-90 parts by mass, wherein the polyacrylate copolymer comprises an ethylene-acrylate-carboxylic acid copolymer, the ethylene-acrylate-carboxylic acid copolymer is a block copolymer, having a molecular formula shown as follows:

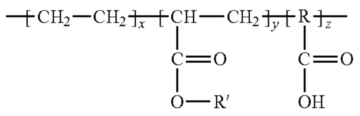

where in the above molecular formula, x, y and z are natural numbers, and R and R' are alkyl groups, a mass ratio of a polyethylene block to a polyacrylate block therein is 5-10, a polycarboxylic acid block accounts for 0.5 wt %-10 wt % of total mass of the polyacrylate copolymer, the polyacrylate copolymer further comprises a vulcanizing agent mixed therein, wherein the vulcanizing agent is 0.5-5 parts by mass, and the vulcanizing agent comprises diethyldithiocarbamate, wherein the polyacrylate copolymer further comprises a plasticizer with 3-7 parts by mass, which comprises at least one of aliphatic dibasic acid esters, phthalic acid esters, benzene polyacid esters, benzoic ethers, polyol esters, chlorinated hydrocarbons, and epoxides, wherein a Shore hardness of the diaphragm has a range of 15-20 A, and wherein a glass transition temperature of the diaphragm has a range of −60 to −20° C.

2. The diaphragm according to claim 1, wherein the reinforcing agent is 2-75 parts by mass.

3. The diaphragm according to claim 1, wherein the polyacrylate copolymer further comprises an ethylene-acrylate copolymer.

4. The diaphragm according to claim 3, wherein the reinforcing agent is 2-70 parts by mass.

5. The diaphragm according to claim 1, further comprising an anti-aging agent mixed in the polyacrylate copolymer, wherein the anti-aging agent is 0.5-10 parts by mass.

6. The diaphragm according to claim 5, wherein the anti-aging agent is 1-5 parts by mass.

7. The diaphragm according to claim 1, further comprising an internal releasing agent mixed in the polyacrylate copolymer, wherein the internal releasing agent is selected from the group consisting of a stearic acid and stearate, an octadecylamine and alkyl phosphate, and an α-octadecyl-ω-hydroxy polyoxyethylene phosphate, and wherein the internal releasing agent is 0.5-5 parts by mass.

8. The diaphragm according to claim 7, wherein the internal releasing agent is 1-3 parts by mass.

9. The diaphragm according to claim 1, wherein the diaphragm is selected from the group consisting of a single-layer diaphragm comprising a polyacrylate copolymer diaphragm layer;

and a composite diaphragm comprising two, three, four or five diaphragm layers including at least a polyacrylate copolymer diaphragm layer.

10. The diaphragm according to claim 9, wherein the polyacrylate copolymer diaphragm layer has a thickness of 10-200 μm.

11. The diaphragm according to claim 10, wherein the polyacrylate copolymer diaphragm layer has a thickness of 30-120 μm.

12. A miniature sound-generating device, comprising a sound-generating device body and the diaphragm of claim 1, wherein the diaphragm is arranged on the sound-generating device body, and the diaphragm generates sound by vibration.

13. The diaphragm according to claim 1, wherein the diaphragm further comprises an amide cross-linked polymer and/or imide cross-linked polymer formed by a reaction of the ethylene-acrylate-carboxylic acid copolymer and an amine substance cross-linking agent, and the amine substance cross-linking agent includes at least one of hexamethylenediamine, hexamethylenediamine carbamate, triethylene tetramine, and methylene diphenylamine.

* * * * *